United States Patent
Nakayama et al.

(10) Patent No.: US 10,050,249 B2
(45) Date of Patent: Aug. 14, 2018

(54) WIRING MODULE AND ELECTRICAL STORAGE MODULE

(71) Applicants: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(72) Inventors: Osamu Nakayama, Mie (JP); Tetsuya Fujita, Mie (JP); Koichiro Mochizuki, Mie (JP); Seishi Kimura, Mie (JP)

(73) Assignees: AutoNetworks Technologies, Ltd., Yokkaichi, Mie (JP); Sumitomo Wiring Systems, Ltd., Yokkaichi, Mie (JP); Sumitomo Electric Industries, Ltd., Osaka-shi, Osaka (JP)

(*) Notice: Subject to any disclaimer, the term of this patent is extended or adjusted under 35 U.S.C. 154(b) by 0 days.

(21) Appl. No.: 15/508,002

(22) PCT Filed: Aug. 21, 2015

(86) PCT No.: PCT/JP2015/073493
§ 371 (c)(1),
(2) Date: Mar. 1, 2017

(87) PCT Pub. No.: WO2016/035572
PCT Pub. Date: Mar. 10, 2016

(65) Prior Publication Data
US 2017/0288199 A1   Oct. 5, 2017

(30) Foreign Application Priority Data

Sep. 2, 2014 (JP) ................................ 2014-177829

(51) Int. Cl.
*H01M 2/00* (2006.01)
*H01M 2/20* (2006.01)
(Continued)

(52) U.S. Cl.
CPC .............. *H01M 2/206* (2013.01); *H01G 2/04* (2013.01); *H01M 2/1077* (2013.01); *H01M 2220/20* (2013.01)

(58) Field of Classification Search
CPC ............. H01M 2/206; H01M 2220/20; H01M 2/1077; H01G 2/04
See application file for complete search history.

(56) References Cited

U.S. PATENT DOCUMENTS 5,804,770 A * 9/1998 Tanaka .................. H01M 2/206
174/138 F
2013/0280589 A1   10/2013 Nakayama
(Continued)

FOREIGN PATENT DOCUMENTS

JP       2012186062 A    9/2012
WO     WO2014064888 A1   9/2016

OTHER PUBLICATIONS

International Search Report and Written Opinion for Application No. PCT/JP2015/073493 dated Nov. 17, 2015, 5 pages.
(Continued)

*Primary Examiner* — Cynthia H Kelly
*Assistant Examiner* — Monique M Wills
(74) *Attorney, Agent, or Firm* — Reising Ethington, P.C.

(57) ABSTRACT

An insulating protector of a wiring module is provided with: a first unit that includes a first holding portion that holds one end side, in a connection direction, of the connection members; and a second unit that includes a second holding portion that holds the other end side, in the connection direction, of the connection members. The second holding portion is contiguous with the first holding portion. The first and second holding portions include separating walls that face side edges of the connection members, and coupling portions that couple the first and the second holding portions to each other. The separating walls include enlarged gap (Continued)

portions that are formed so that gaps between the enlarged gap portions and the side edges of the connection members are larger on the side where the coupling portions are located than on the side where ends of the connection members are located.

6 Claims, 8 Drawing Sheets

(51) Int. Cl.
     *H01G 2/04*      (2006.01)
     *H01M 2/10*      (2006.01)

(56) References Cited

U.S. PATENT DOCUMENTS

2014/0363723 A1* 12/2014 Imai ................. H01M 2/206
                                                                         429/121
2015/0243947 A1     8/2015 Seto

OTHER PUBLICATIONS

English Translation of International Search Report for Application No. PCT/JP2015/073493 dated Nov. 17, 2015, 1 page.

\* cited by examiner

WIRING MODULE AND ELECTRICAL STORAGE MODULE

CROSS REFERENCE TO RELATED APPLICATIONS

This application claims the priority of Japanese patent application JP2014-177829 filed on Sep. 2, 2014, the entire contents of which are incorporated herein.

TECHNICAL FIELD

The present invention relates to a wiring module and an electrical storage module.

BACKGROUND ART

Electrical storage modules for electric cars and hybrid cars include a plurality of electrical storage elements with positive and negative electrode terminals, the plurality of electrical storage elements being connected to each other in series or parallel such that adjacent electrode terminals of the plurality of electrical storage elements are connected to each other by connection members made of metal.

Patent Document 1 (JP2012-186062A) discloses that one side of a connection member is held by a first unit, the other side of the connection member is held by a second unit, and the connection member can slide and move in a connection direction of the connection member over a range of predetermined clearances between the connection member and the first unit, and between the connection member and the second unit. Accordingly, errors in size between the plurality of electric cells, and the first unit and second unit that are mounted thereto can be absorbed in the connection direction of the connection member, making it possible to mount the first unit and the second unit to a plurality of electric cells.

SUMMARY OF INVENTION

However, in the above-described configuration, errors in size between the plurality of electric cells, and the first unit and the second unit in the connection direction (long-length direction of terminal surfaces of the electric cells) of the connection member can be absorbed by the above-described sliding movement, but it is not possible to absorb errors in size between the plurality of electric cells, and the first unit and the second unit in a direction that intersects with the connection direction (short-length direction of terminal surfaces of the electric cells, for example) of the connection member by the above-described sliding movement if there is an error in positions of the plurality of electric cells, causing a risk that a failure occurs when a wiring module is mounted.

The present design was made in view of the above-described circumstances, and it is an object thereof to prevent problems due to an error in positions of a first unit and a second unit that are mounted to a plurality of electrical storage elements when a wiring module is mounted.

According to a first embodiment, a wiring module includes: a connection member for connecting electrode terminals of a plurality of electrical storage elements, each electrical storage element including a positive electrode terminal and a negative electrode terminal; and an insulating protector in which the connection member is accommodated, wherein the insulating protector is provided with a first unit that includes a first holding portion that holds one end side, in a connection direction, of the connection member, and a second unit that includes a second holding portion that holds the other end side, in the connection direction, of the connection member, the second holding portion being contiguous with the first holding portion, the first holding portion and the second holding portion include separating walls that face side edges of the connection member extending in the connection direction, and coupling portions that couple the first holding portion and the second holding portion to each other, and the separating walls each include an enlarged gap portion that is formed such that a gap between the enlarged gap portion and the side edge of the connection member that extends in the connection direction is larger on the coupling portion side than on a side where an end, in the connection direction, of the connection member is located.

According to the present configuration, even if, due to an error in the positions of the plurality of electrical storage elements, an error in positions at which the first unit and the second unit are mounted occurs in a direction that intersects with the connection direction of the connection member, it is possible to mount the first unit and the second unit to the plurality of electrical storage elements by using a clearance generated between the enlarged gap portions and the side edges of the connection member to cause the first unit and the second unit to be misaligned via the connection member. Accordingly, in the direction that intersects with the connection direction of the connection member, it is possible to prevent problems due to an error in the positions of the first unit and the second unit that are mounted to the plurality of electrical storage elements when the wiring module is mounted.

Preferably, embodiments of the present application include the following configurations:

The connection member is provided with through holes through which fastening members for fastening the connection member to the electrical storage elements are inserted, and the enlarged gap portions are formed on the coupling portion side in the connection direction of the connection member with respect to centers of the through holes.

With this measure, fastening is possible with the parts that are fastened by the fastening members being positioned at a predetermined position and without being shifted.

At least one of the first holding portion and the second holding portion, and the connection member are capable of slidingly moving in the connection direction of the connection member, and the side edges, in the connection direction, of the connection member are respectively provided with engaged portions, and the at least one of the first holding portion and the second holding portion is provided with engaging portions that engage with the engaged portions to allow the sliding movement over a range of a predetermined clearance.

With this measure, it is possible to absorb errors in not only the direction that is orthogonal to (intersects with) the connection direction of the connection member, but also the connection direction of the connection member.

The enlarged gap portions are formed on the coupling portion side with respect to the engaging portions.

The enlarged gap portions are formed so that the gap between the separating walls and the side edges of the connection member that extend in the connection direction increases toward the coupling portion side.

An electrical storage module includes: a pair of electrical storage element groups in each of which the plurality of electrical storage elements are stacked, and the wiring module according to any one of claims 1 to 5, wherein the first unit is mounted on one of the pair of electrical storage element groups, and the second unit is mounted on the other one of the electrical storage element groups.

According to the present design, it is possible to prevent problems due to an error in positions of a first unit and a second unit that are mounted to a plurality of electrical storage elements when a wiring module is mounted.

DESCRIPTION OF EMBODIMENTS

An embodiment will be described with reference to FIGS. 1 to 8.

A wiring module 20 according to the present embodiment is mounted on electrical storage element groups 11A and 11B that are each constituted by a plurality of electrical storage elements 12, so that electrode terminals 14A and 14B of the electrical storage elements 12 are connected to each other by connection members 21A and 21B. An electrical storage module 10 to which the wiring module 20 is attached is used as, for example, a driving source of a vehicle such as an electric car or a hybrid car. In the following, description is given assuming that "right" refers to the X direction of FIG. 1, "left" refers to the direction that is opposite to the X direction, "front" refers to the Y direction of FIG. 1, and "rear" refers to the direction that is opposite to the Y direction.

Figure 1:
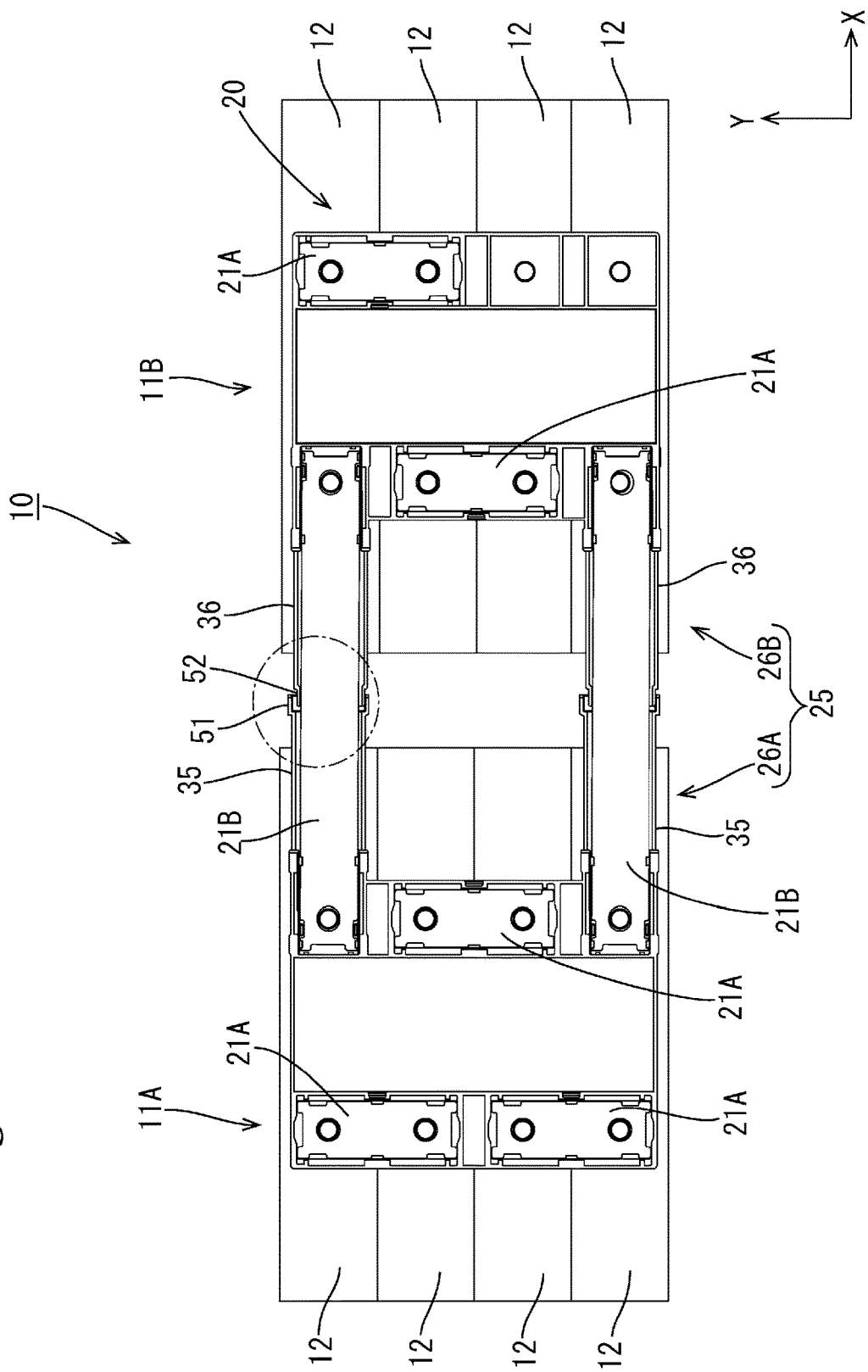
FIG. 1 is a plan view illustrating an electrical storage module according to an embodiment.

As shown in FIG. 1, the electrical storage module 10 is provided with the pair of electrical storage element groups 11A and 11B, and the wiring module 20 that is mounted on the pair of electrical storage element groups 11A and 11B.

Figure 3:
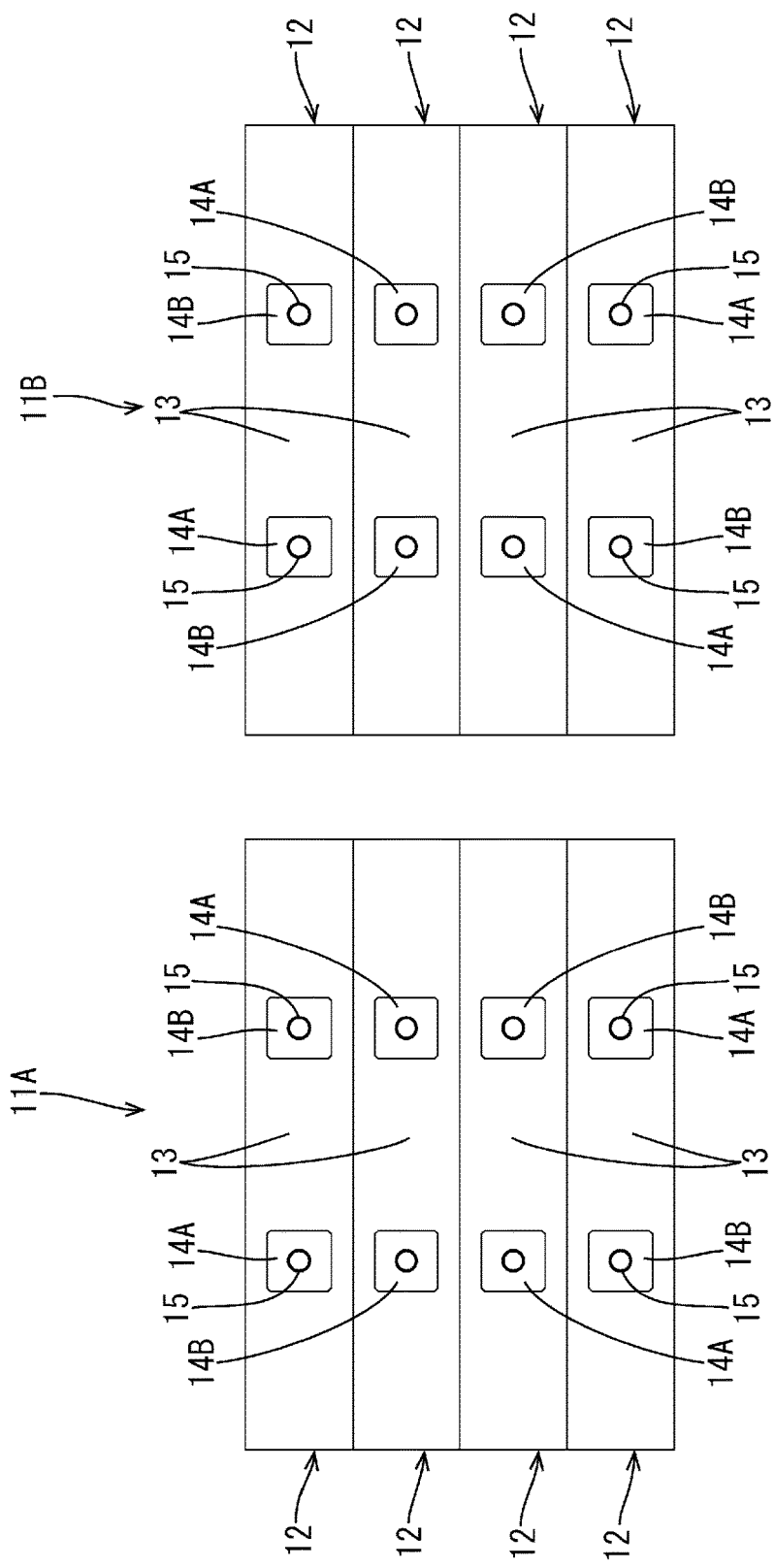
FIG. 3 is a plan view illustrating a pair of electrical storage element group.

As shown in FIG. 3, the pair of electrical storage element groups 11A and 11B are arranged side by side in the left-right direction, and each electrical storage element group includes the plurality of (four in the present embodiment) electrical storage elements 12 that are stacked in the front-rear direction. Each electrical storage element 12 includes a flat cuboid-shaped main portion 13 in which a not-shown electric storage element is accommodated, and a pair of positive and negative electrode terminals 14A and 14B (the positive electrode is shown by the reference numeral 14A and the negative electrode is shown by the reference numeral 14B) that perpendicularly protrude from an end surface of the flat cuboid-shaped main portion 13. The electrode terminals 14A and 14B are rectangular, which are arranged on the main portion 13, and each have a nut in which a screw hole 15 is formed. The plurality of electrical storage elements 12 are stacked with their large-area surfaces against each other in the front-rear direction, and constitute the electrical storage element groups 11A and 11B. The electrical storage elements 12 of the electrical storage element groups 11A and 11B are arranged in an orientation such that the polarities of adjacent electrode terminals 14A and 14B are opposite. The wiring module 20 is fixed to the electrical storage element groups 11A and 11B, by screwing bolts serving as fastening members into the screw holes 15 of the electrode terminals 14A and 14B.

Figure 4:
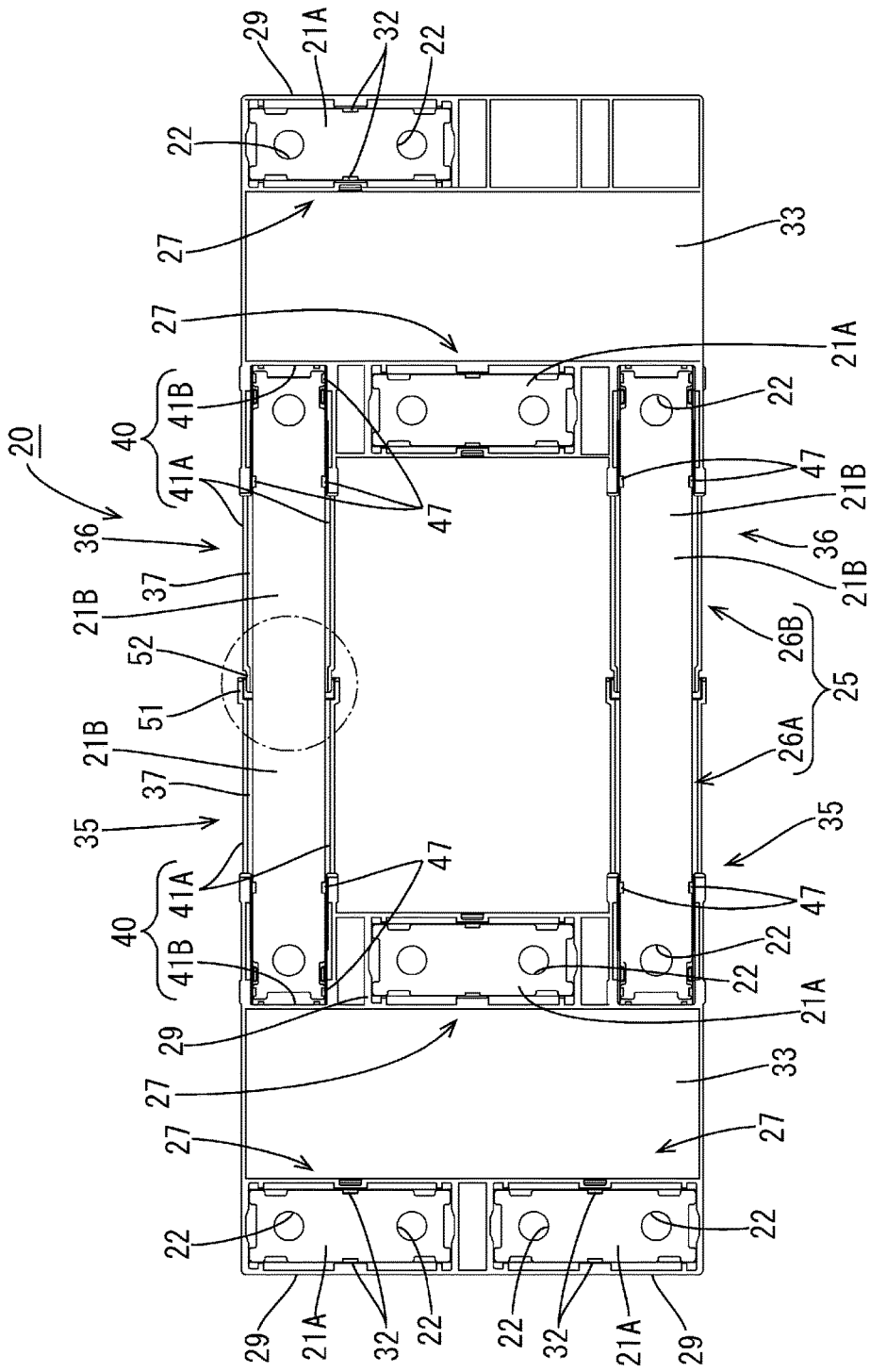
FIG. 4 is a plan view illustrating a wiring module.

As shown in FIG. 4, the wiring module 20 is provided with a plurality of connection members 21A and 21B that connect the electrode terminals 14A and 14B of adjacent electrical storage elements 12, and insulating protectors 25 that are made of a synthetic resin, and receive the plurality of connection members 21A and 21B.

The connection members 21A and 21B are made of plate-shaped metal such as copper, a copper alloy, stainless steel (SUS), or aluminum, and include: a plurality of (six in the present embodiment) short connection members 21A that connect the electrode terminals 14A and 14B of the electrical storage elements 12 stacked in the front-rear direction; and a plurality of (two in the present embodiment) long connection members 21B that are longer than the short connection members 21A, and connect the electrode terminals 14A and 14B of the different electrical storage element groups 11A and 11B.

The connection members 21A and 21B are each provided with, in the end portions thereof in the connection direction, a pair of true circle-shaped through holes 22 through which the shafts of bolts are inserted. The through holes 22 of the connection members 21A have a hole diameter that is able to absorb a tolerance in size between the electrode terminals 14A and 14B that are adjacent to the connection members 21A in up-down direction. The hole diameter is larger than the outer diameter of the shafts of the bolts.

Figure 6:
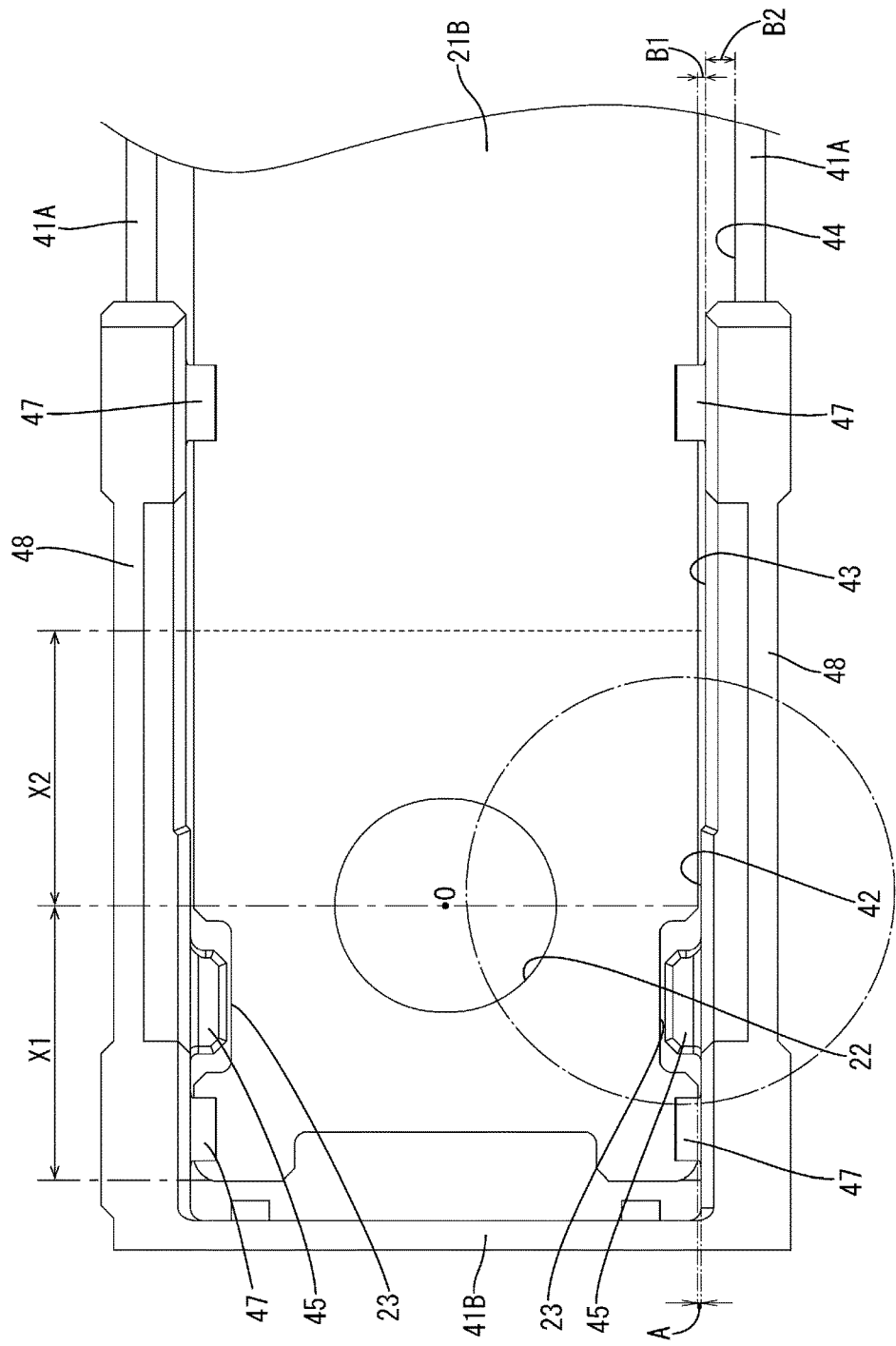
FIG. 6 is an enlarged view of a part of a first holding portion of FIG. 4.

The long connection members 21B have a constant width (dimension in the front-rear direction) over their entire length, and are provided with engaged portions 23 in both side edges in the connection direction of the long connection members 21B, as shown in FIG. 6. The engaged portions 23 are formed by cutting out rectangular shapes from the edges, on both sides, of the long connection members 21B.

Note that voltage detection terminals that are connected to terminals of voltage detection wires may be overlaid on the connection members 21A and 21B to detect the voltages of the electrical storage elements 12. The voltage detection wires are connected to a battery ECU for controlling charging and discharging of the electrical storage elements 12, and the like.

Figure 8:
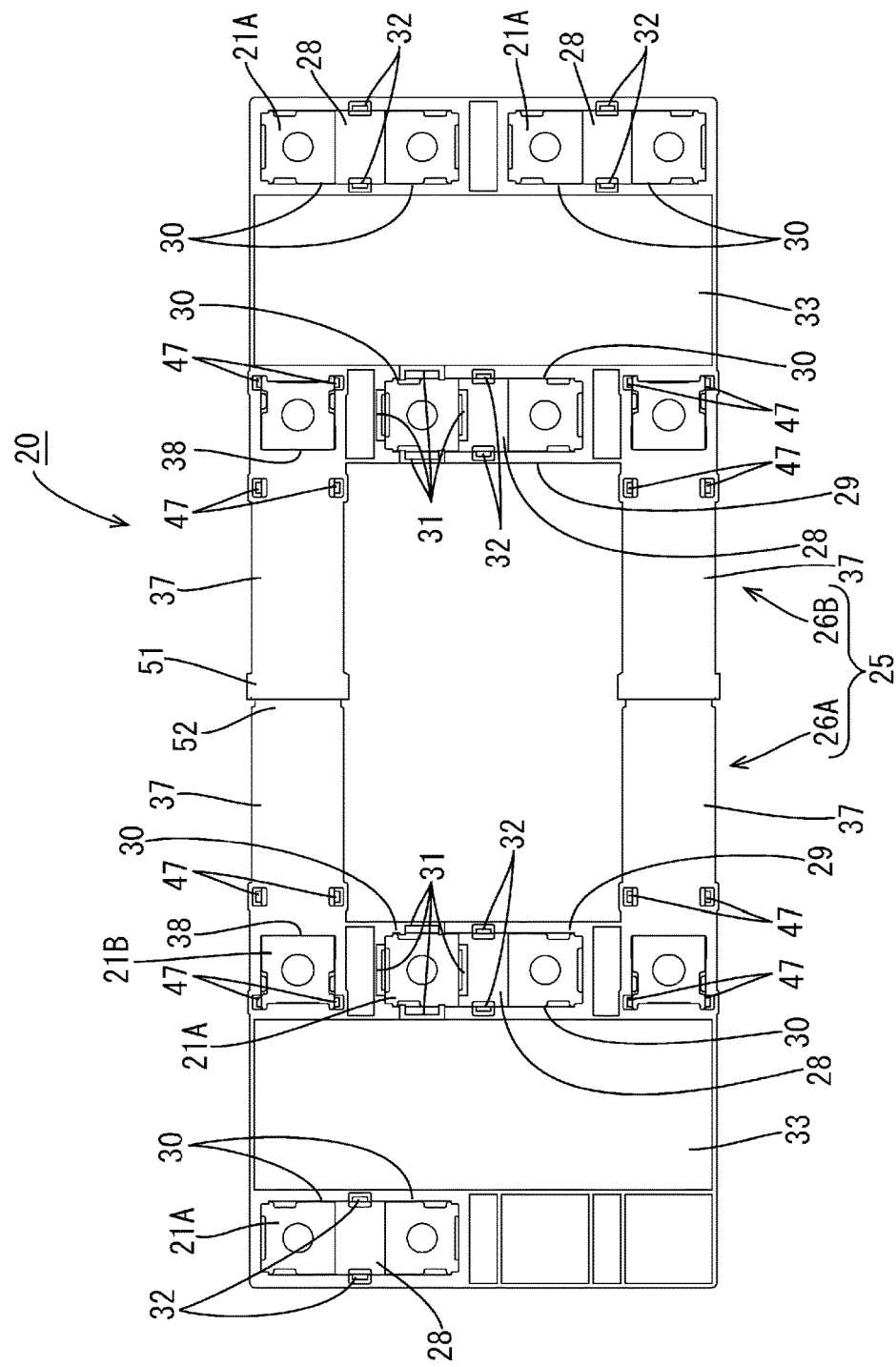
FIG. 8 is a bottom view of the wiring module.

As shown in FIGS. 4 and 8, the insulating protectors 25 are configured by a first unit 26A and a second unit 26B that are both made of an insulating synthetic resin, and are arranged contiguously to each other in the left-right direction on the same plane.

The first unit 26A is provided with: a plurality of (three in the present embodiment) accommodation portions 27 in which the plurality of short connection members 21A are accommodated; a plurality of (two in the present embodiment) first holding portions 35 that hold one end side of a plurality of (two on the front and rear in the present embodiment) long connection members 21B; and plate-shaped portions 33 that span the left and right accommodation portions 27, and the like in the shape of a plate.

The second unit 26B is provided with: a plurality of (two in the present embodiment) accommodation portions 27 in which the plurality of short connection members 21A are accommodated; a plurality of (two on the front and rear in the present embodiment) second holding portions 36 that hold one end side of the plurality of long connection members 21B; and plate-shaped portions 33 that span the left and right accommodation portions 27, and the like in the shape of a plate. Note that, although not shown, an input and output portion that is to be connected to the outside is accommodated in a space on the rear side of the right end part of the second unit 26B.

Each accommodation portion 27 is provided with a bottom plate 28 on which the short connection member 21A is placed, and a square-tubular partition wall 29 that encloses the short connection member 21A. The bottom plate 28 couples the base end portions of the partition wall 29 that face each other. Rectangular openings 30 are formed to the left and right of the bottom plate 28. The electrode terminals 14A and 14B enter these openings 30, and the upper surfaces of the electrode terminals 14A and 14B come into contact with the bottom surface of the short connection member 21A.

The rear surfaces of the accommodation portions 27 are provided with positioning portions 31 that are fitted to the electrode terminals 14A and 14B that serve as references for positioning of the pair of electrical storage element groups 11A and 11B so as to perform positioning, the positioning portions 31 being located around the openings 30 through which these electrode terminals 14A and 14B are inserted. The positioning portions 31 are externally fitted to the electrode terminals 14A and 14B from four sides, and are positioned with respect to the electrode terminals 14A and 14B. Four positioning portions 31 protrude downward and are provided for each electrode terminal 14A (14B) so as to enclose the electrode terminal 14A (14B). The positioning portions 31 position the electrode terminals 14A and 14B of those electrical storage elements 12 that are arranged in the middle in the stacking direction. Accordingly, by using the electrical storage elements 12 in the middle in the stacking direction as references for positioning, it is possible to avoid enlarging the hole diameter of the through holes 22 for absorbing a tolerance in the stacking direction of the electrical storage elements 12.

The partition wall 29 is formed along the outer edge of the short connection member 21A, and has a height that can prevent shorts due to a tool or the like coming into contact with the short connection member 21A, the head of a bolt, or the like. The partition wall 29 is provided with, in the base end part thereof, a pair of holding pieces 32 that hold the short connection member 21A in the accommodation portion 27. The holding pieces 32 are flexible and deformable, and keep the short connection member 21A from being removed upward, as a result of the front ends of the holding pieces 32 being located above the edge parts of the bottom plate 28.

The first holding portions 35 and the second holding portions 36 are provided in accordance with the positions, on the insulating protector 25, of the long connection members 21B that connect the electrode terminals 14A and 14B of the different electrical storage element groups 11A and 11B. The first holding portions 35 hold the left end side (one end side) of the long connection members 21B, and the second holding portions 36 hold the right end side (the other end side) of the long connection members 21B, the second holding portions 36 including coupling portions 52, which are coupled to coupling portions 51 of the first holding portion.

The first holding portions 35 and the second holding portions 36 are provided with bottom plates 37 on which the long connection members 21B are placed, and separating walls 40 that separate the long connection members 21B from the outside. Each bottom plate 37 extends from the end side of the long connection member 21B to the middle part in the connection direction of the long connection member 21B, and has a rectangular opening 38 that penetrates the bottom plate 37, the rectangular opening 38 being located under the end of the long connection member 21B. The openings 30 are openings that the electrode terminals 14A and 14B enter, and as a result of the electrode terminal 14A and 14B entering the openings 30, the upper surfaces of the electrode terminals 14A and 14B are brought into contact with the bottom surface of the long connection member 21B.

The height of the separating walls 40 are set to a height that can prevent shorts due to a tool or the like coming into contact with the long connection member 21B, the head of a bolt, or the like. The separating walls 40 include, in the base end parts thereof, a plurality of holding pieces 47 that hold the long connection member 21B in the accommodation portion 27. The holding pieces 47 are flexible and deformable, and keep the long connection member 21B from being removed from the bottom plate 37, as a result of the front ends of the holding pieces 47 being located above the edge parts of the bottom plate 37.

Figure 7:
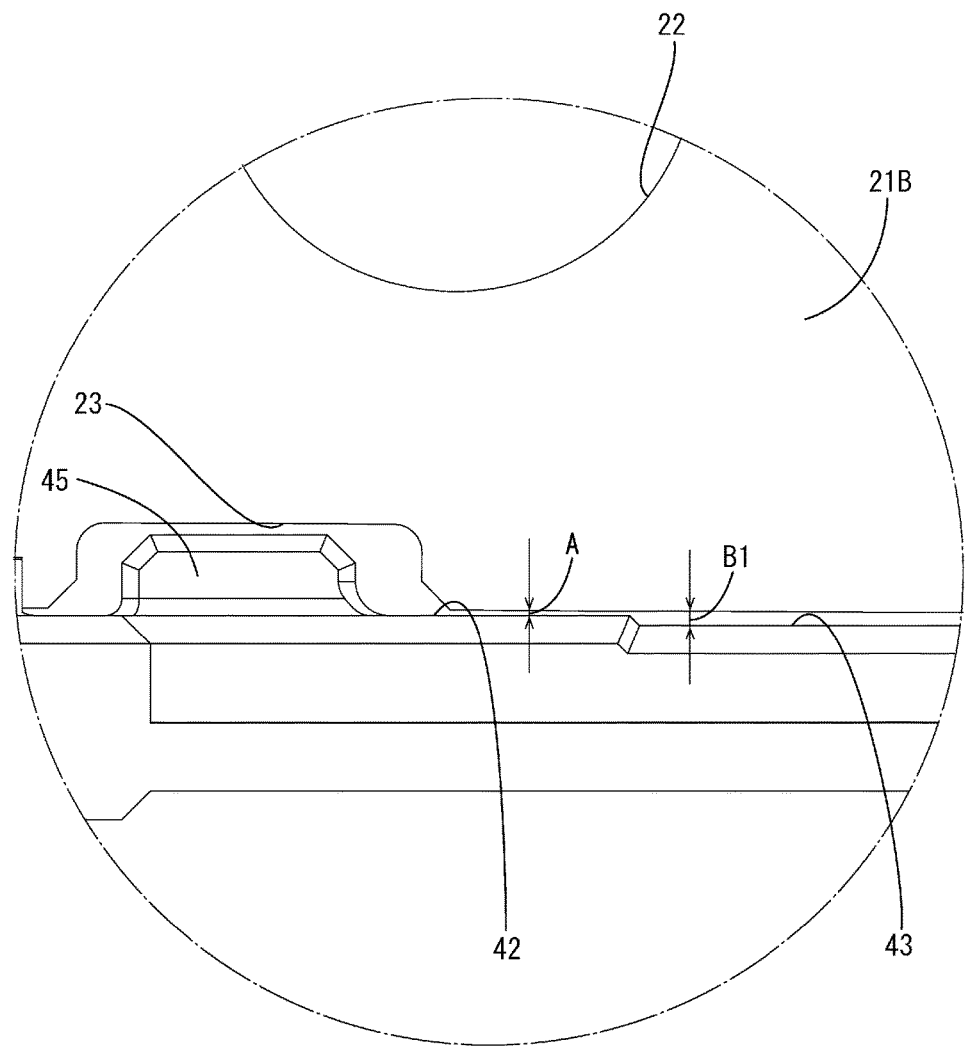
FIG. 7 is an enlarged view of a part of FIG. 6.

The separating walls 40 include a pair of opposite walls 41A that are arranged opposite to each other in the front-rear direction, and face the side edges, in the connection direction, of the long connection member 21B, and side walls 41B that are contiguous with the pair of opposite walls 41A. The side walls 41B have, between the side walls 41B and the end edges in the connection direction of the long connection member 21B, gaps for allowing the long connection member 21B to slide and move in the connection direction. As shown in FIGS. 6 and 7, each opposite wall 41A includes: a reduced gap portion 42 that defines a small gap A together with the side edge of the long connection member 21B; a first enlarged gap portion 43 that defines a gap B1 together with the side edge of the long connection member 21B that is larger than the gap A of the reduced gap portion 42; and a second enlarged gap portion 44 that defines a gap B2 together with the side edge of the long connection member 21B that is larger than the gap B1 of the first enlarged gap portion 43, in the stated order from the end of the edge in the connection direction of the long connection member 21B.

The reduced gap portions 42 define a very small gap A (there is almost no gap) together with the side edges of the long connection member 21B. The reduced gap portions 42 are formed from the end of the long connection member 21B to positions beyond the center of the through hole 22.

The first enlarged gap portions 43 and the second enlarged gap portions 44 are formed by cutting out the inner side of the opposite walls 41A. The first enlarged gap portions 43 pass through positions at a distance X2 (=X1) from the center of the through hole 22 toward the coupling portions 51 and 52, where "X1" is a distance from the center of the through hole 22 to the end edge, in the connection direction, of the long connection member 21B. Due to the first enlarged gap portions 43 and the second enlarged gap portions 44, the gap between the pair of opposite walls 41A in these parts is larger, and thus also the clearances between the side edges of the long connection member 21B and the opposite walls 41A that faces the side edges are larger.

Note that the holding pieces 47 formed on the enlarged gap portion 43 and 44 side are formed at the front end part of extension portions 48 that extend from the reduced gap portion 42 side. The extension portions 48 are arranged on the opposite walls 41A.

In the space between the opposite walls 41A, engaging portions 45 are provided that are to engage with the engaged portions 23 of the long connection member 21B when the long connection member 21B slides and moves. The engaging portions 45 are provided in the base end parts of the opposite walls 41A at the positions that correspond to the engaged portions 23, and protrude inward in a rectangular shape. The length, in the left-right direction, of the engaging portions 45 is smaller than the length, in the left-right direction, of the engaged portions 23, and a clearance of a predetermined length is formed in the left-right direction between the engaged portion 23 and the engaging portion 45. As a result of the engaged portions 23 being engaged with the engaging portions 45, the long connection member 21B is kept from sliding and moving in the left-right direction over a range that is larger than the clearance.

Figure 5:
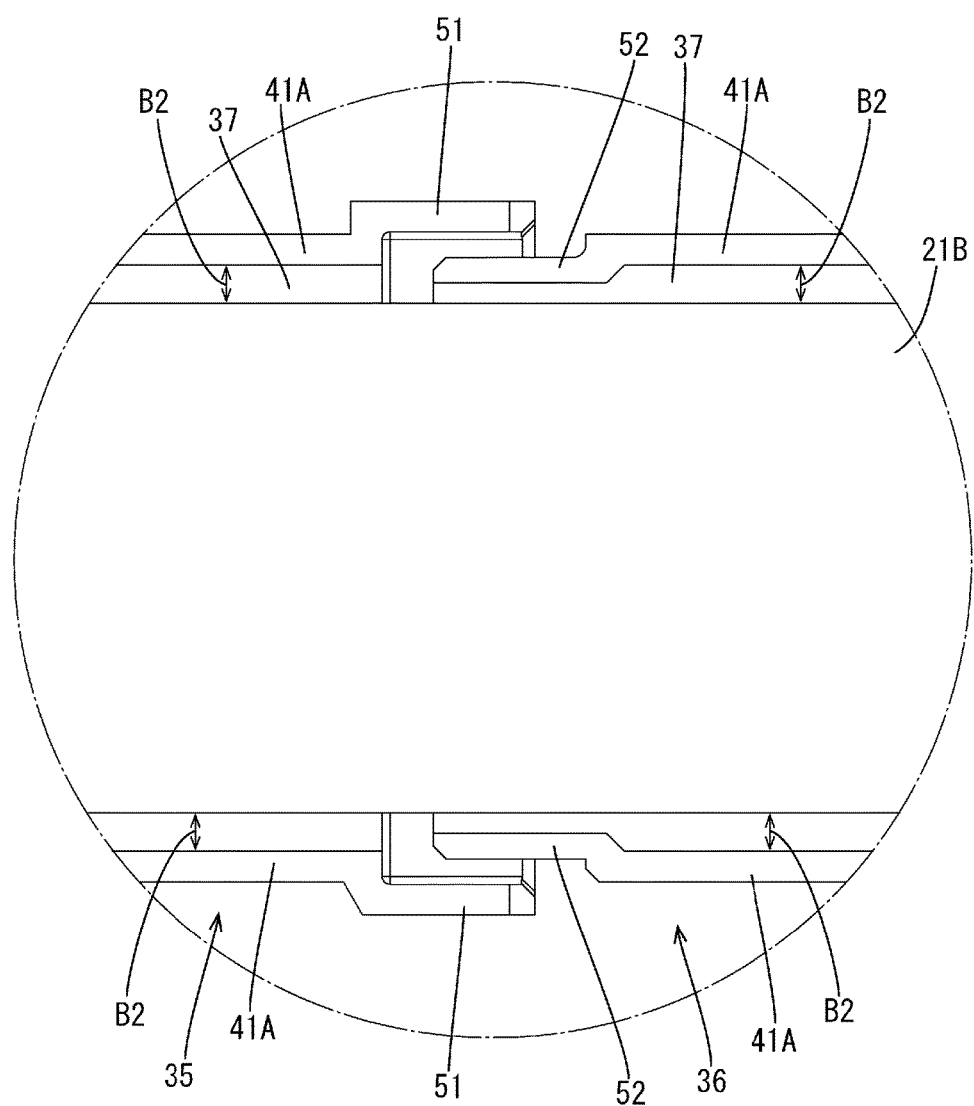
FIG. 5 is an enlarged view of a vicinity of coupling portions of FIG. 4.

As shown in FIG. 5, the coupling portions 51 and 52 are provided at the respective ends of the first holding portion 35 and the second holding portion 36 so as to couple them to each other. The coupling portion 51 is formed by the ends of the opposite walls 41A protruding outward in form of a step, and the end of the bottom plate 37 being depressed downward in form of a step. The coupling portion 52 is formed by the ends of the opposite walls 41A being slightly depressed inward in form of a step, and the end of the bottom plate 28 extending at constant height to the first holding portion 35 side. The bottom plate 28 of the coupling portion 52 is placed on the bottom plate 28 of the coupling portion 51.

The following will describe mounting the wiring module 20 to the pair of electrical storage element groups 11A and 11B.

The pair of electrical storage element groups 11A and 11B, in which four electrical storage elements 12 are stacked, are arranged side by side. In the present embodiment, the positions of the one electrical storage element group 11A and the other electrical storage element group 11B in the front-rear direction differ from each other by a dimension C1 (see FIG. 2).

Then, the connection members 21A and 21B are accommodated in the insulating protector 25 in which the first unit 26A and the second unit 26B are arranged side by side in the left-right direction, forming the wiring module 20 (FIG. 4).

Then, the positioning portions 31 of the wiring module 20 are positioned at the positions of the corresponding electrode terminals 14A and 14B (the inner electrode terminals 14A and 14B of the second electrical storage elements 12 from the front) of the electrical storage element groups 11A and 11B, and the wiring module 20 is placed at a predetermined position on the pair of electrical storage element groups 11A and 11B.

At that time, a stack tolerance in the front-rear direction of the plurality of electrical storage elements 12 that are adjacent in the front-rear direction is absorbed by the large hole diameter of the through holes 22 of the connection members 21A and 21B. Due to the through holes 22 and the positioning portions 31, it is possible to mount the wiring module 20, even in the case of a stack tolerance in the plurality of electrical storage elements 12, which are adjacent to each other in the front-rear direction, with respect to the electrode terminals 14A and 14B in the middle in the front-rear direction.

Figure 2:
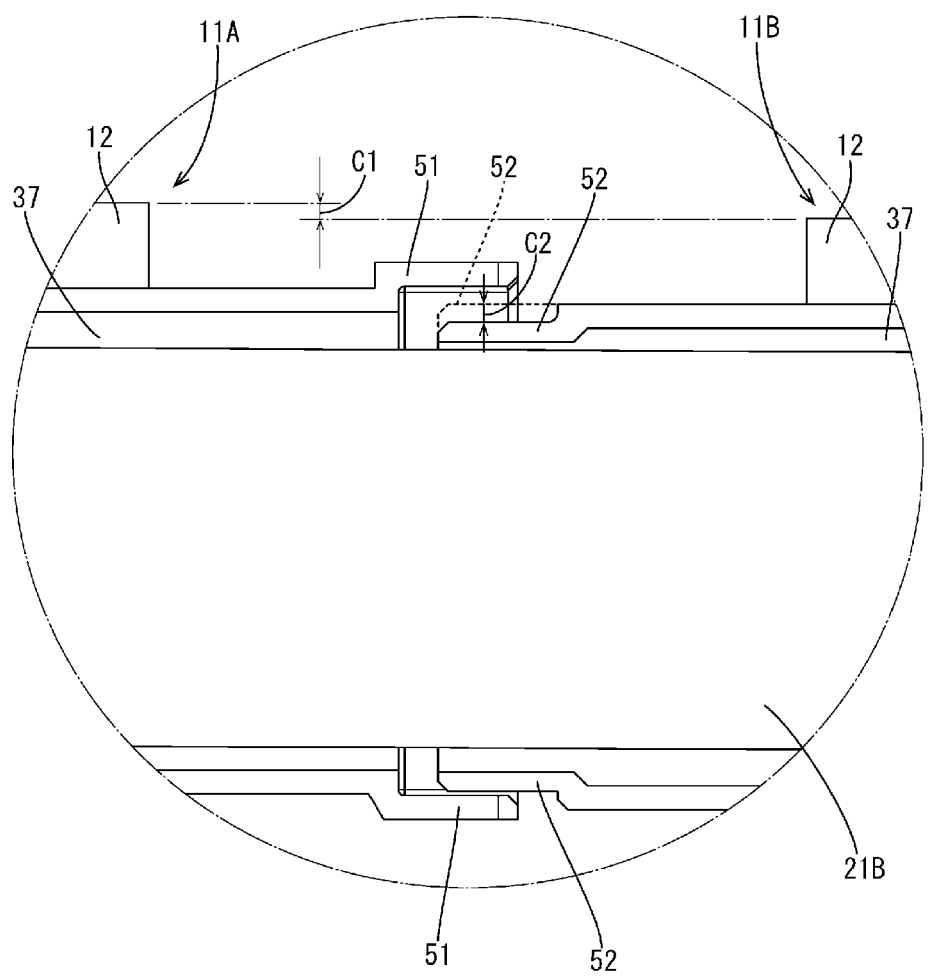
FIG. 2 is an enlarged view of a vicinity of coupling portions of FIG. 1.

Here, as shown in FIG. 2, in the present embodiment, since the pair of electrical storage element groups 11A and 11B are misaligned in their positions in the front-rear direction, there is a positional misalignment in the relative positions between the first unit 26A and the second unit 26B that are mounted on the pair of electrical storage element groups 11A and 11B. Due to the positional misalignment, the first holding portion 35 and the second holding portion 36 are relatively moved in the front-rear direction via the long connection member 21B, because, due to the enlarged gap portions 43 and 44 that are provided on the first holding portions 35 and the second holding portions 36, the gap between the side edges of the long connection member 21B and the separating walls 40 is large on the side on which the coupling portions 51 and 52 are located. Accordingly, the positions of the first holding portion 35 and the second holding portion 36 are misaligned by a dimension C2 in accordance with the difference in the positions between the electrical storage element groups 11A and 11B.

Furthermore, as a result of the long connection member 21B sliding and moving with respect to the first holding portion 35 and the second holding portion 36 over a range of the clearance between the engaged portions 23 and the engaging portions 45, an error in the positions, in the left-right direction, of the electrical storage element groups 11A and 11B is absorbed.

According to the present embodiment, the following functions and effects can be achieved.

There may be cases where, due to a misalignment in the arrangements of the plurality of electrical storage elements 12, an error in the positions at which the first unit 26A and the second unit 26B are mounted from their correct positions has occurred in a direction that is orthogonal to (intersects with) the connection direction of the long connection member 21B. According to the present embodiment, by using a clearance that is generated between the enlarged gap portions 43 and 44, and the side edges extending in the connection direction of the connection member 21B to generate a positional misalignment between the first unit 26A and the second unit 26B, it is possible to mount the first unit 26A and the second unit 26B on the plurality of electrical storage elements 12 even in the case of a misalignment in the arrangement of the plurality of electrical storage elements 12. Accordingly, it is possible to prevent problems due to an error in the positions, in the direction that intersects with the connection direction of the long connection member 21B, between first unit 26A and the second unit 26B that are mounted to the plurality of electrical storage elements 12, when the wiring module 20 is mounted.

Furthermore, the long connection members 21B have through holes 22 into which fastening members for fastening this long connection member 21B to the electrical storage elements 12 are inserted, and the enlarged gap portions 43 and 44 are formed on the side on which the coupling portions 51 and 52 are located, in the connection direction of the long connection member 21B, with respect to the centers of the through holes 22.

With such a measure, fastening is possible with the parts that are fastened by the fastening members being positioned at a predetermined position and without being shifted in the direction that is orthogonal to (intersects with) the connection direction of the long connection member 21B.

Furthermore, at least one of the first holding portion 35 and the second holding portion 36, and the long connection member 21B can slide and move in the connection direction of the long connection member 21B, the side edges extending in the connection direction of the long connection member 21B are provided with the engaged portions 23, and at least one of the first holding portion 35 and the second holding portion 36 is provided with the engaging portions 45 that are to engage with the engaged portions 23 so as to allow the sliding movement over a range of a predetermined clearance.

With this measure, it is possible to absorb errors in not only the direction that is orthogonal to (intersects with) the connection direction of the long connection member 21B, but also the connection direction of the long connection member 21B, thus making it possible to absorb errors in the front-rear and left-right directions to prevent problems due to an error in size when the wiring module 20 is mounted.

Furthermore, as a result of the enlarged gap portions 43 and 44 being formed on the side on which the coupling portions 51 and 52 are located with respect to the engaging portions 45, the parts of the engaging portions 45 do not need to be cut out for the enlarged gap portions 43 and 44, and thus it is possible to easily form the engaging portions 45.

Furthermore, since the enlarged gap portions 43 and 44 are formed such that the gap between the separating walls 40 and the side edges of the long connection member 21B increases stepwise toward the side on which the coupling portions 51 and 52 are located, processing is easier than a case where the gap increases in a slope. Furthermore, by forming the holding pieces 47 in the small cut-out parts of the separating walls 40, the holding pieces 47 on the separating walls 40 can be easily formed.

Moreover, the electrical storage module 10 includes a pair of electrical storage element groups 11A and 11B in which a plurality of electrical storage elements 12 are stacked, and the wiring module 20, and the first unit 26A is mounted on the electrical storage element group 11A, which is one of the pair of electrical storage element groups 11A and 11B, and the second unit 26B is mounted on the other electrical storage element group 11B.

Accordingly, it is possible to prevent problems due to an error in size between the pair of electrical storage element groups 11A and 11B, when the wiring module 20 is mounted.

The present invention is not limited to the embodiment explained with reference to the description and the drawings, and the technical scope of the present invention also includes, for example, the following embodiments.

Although the enlarged gap portions 43 and 44 are provided on both of the first holding portion 35 and the second holding portion 36, the enlarged gap portions 43 and 44 may be provided on either one of the first holding portion 35 and the second holding portion 36.

Although the enlarged gap portions 43 and 44 are provided so that the gaps between the enlarged gap portions 43 and 44 and the side edges of the long connection member 21B increase stepwise toward the coupling portions 51 and 52, the present invention is not limited to this, and the enlarged gap portions may be such that the gaps between the enlarged gap portions 43 and 44 and the side edges of the long connection member 21B increase gradually and as a slope.

Although the enlarged gap portions 43 and 44 are provided so that the gaps between the enlarged gap portions 43 and 44 and the side edges of the long connection member 21B increase in two stages (plurality of stages) toward the coupling portions 51 and 52, the enlarged gap portions may be provided in only one stage.

Although the foregoing embodiment has a configuration in which bolts serving as fastening members are used to perform fastening, the present invention is not limited to this, and a configuration is also possible in which the electrode terminals are formed as bolts that have a thread on their outer circumferential surface, and nuts serving as the fastening members are fastened to the electrode terminals.

The number of the electrical storage elements 12 is not limited to the number in the foregoing embodiment. The shape of the wiring module 20 may also be set to any shape according to the number of the electrical storage elements 12.

The electrical storage elements 12 are battery cells, but capacitors may be used.

In the electrical storage element groups 11A and 11B, the same number of electrical storage elements 12 are stacked, but a different number of electrical storage elements 12 may be stacked as well.

REFERENCE SIGNS LIST

10: Electrical storage module
11A, 11B: Electrical storage element group
12: Electrical storage element
14A, 14B: Electrode terminal
20: Wiring module
21A: Short connection member
21B: Long connection member
22: Through hole
23: Engaged portion
25: Insulating protector
26A: First unit
26B: Second unit
35: First holding portion
36: Second holding portion
40: Separating walls
41: Opposite walls
43: First enlarged gap portion (enlarged gap portion)
44: Second enlarged gap portion (enlarged gap portion)
45: Engaging portion
51, 52: Coupling portion

The invention claimed is:

1. A wiring module comprising:
a connection member for connecting electrode terminals of a plurality of electrical storage elements, each electrical storage element including a positive electrode terminal and a negative electrode terminal; and
an insulating protector in which the connection member is accommodated,
wherein the insulating protector is provided with a first unit that includes a first holding portion that holds an end side, in a connection direction, of the connection member, and a second unit that includes a second holding portion that holds an opposite end side, in the connection direction, of the connection member, the second holding portion being contiguous with the first holding portion,
the first holding portion connects to a first bottom plate and the second holding portion connects to a second bottom plate, the first bottom plate extending from the end side and the second bottom plate extending from the opposite end side such that the first bottom plate and the second bottom plate are coupled at a middle between the end side and the opposite end side,
the first holding portion and the second holding portion include separating walls that face side edges of the connection member extending in the connection direction, and coupling portions that couple the first holding portion and the second holding portion to each other, and
the separating walls each include an enlarged gap portion that is formed such that a gap between the enlarged gap portion and the side edge of the connection member that extends in the connection direction is larger on the coupling portion side than on a side where the end side or the opposite end side, in the connection direction, of the connection member is located.

2. The wiring module according to claim 1,
wherein the connection member is provided with through holes through which fastening members for fastening the connection member to the electrical storage elements are inserted, and
the enlarged gap portions are formed on the coupling portion side in the connection direction of the connection member with respect to centers of the through holes.

3. The wiring module according to claim 1,
wherein at least one of the first holding portion and the second holding portion, and the connection member are capable of slidingly moving in the connection direction of the connection member, and
the side edges, in the connection direction, of the connection member are respectively provided with engaged portions, and the at least one of the first holding portion and the second holding portion is provided with engaging portions that engage with the engaged portions to allow the sliding movement over a range of a predetermined clearance.

4. The wiring module according to claim 3,
wherein the enlarged gap portions are formed on the coupling portion side with respect to the engaging portions.

5. The wiring module according to claim 1,
wherein the enlarged gap portions are formed so that the gap between the separating walls and the side edges of the connection member that extend in the connection direction increases toward the coupling portion side.

6. An electrical storage module comprising:
a pair of electrical storage element groups in each of which the plurality of electrical storage elements are stacked, and
the wiring module according to claim 1,
wherein the first unit is mounted on one of the pair of electrical storage element groups, and the second unit is mounted on the other one of the electrical storage element groups.

* * * * *